Sept. 27, 1966  D. OHL  3,275,054
COMPRESSION LOCKING NUT
Filed Dec. 15, 1964  3 Sheets-Sheet 1

Sept. 27, 1966  D. OHL  3,275,054
COMPRESSION LOCKING NUT
Filed Dec. 15, 1964  3 Sheets-Sheet 2

Sept. 27, 1966        D. OHL        3,275,054

COMPRESSION LOCKING NUT

Filed Dec. 15, 1964        3 Sheets-Sheet 3

United States Patent Office 3,275,054
Patented Sept. 27, 1966

3,275,054
COMPRESSION LOCKING NUT
David Ohl, Rochester, N.Y., assignor, by mesne assignments, to Standard Pressed Steel Co., Jenkintown, Pa., a corporation of Pennsylvania
Filed Dec. 15, 1964, Ser. No. 418,431
10 Claims. (Cl. 151—5)

This application is a continuation-in-part of applications Serial No. 99,830, filed March 31, 1961, and Serial No. 232,837, filed October 24, 1962, both now abandoned.

This invention relates to a locking nut for threaded members such as bolts, and more particularly to a nut which is locked to the screw threads onto which it is screwed, by the compression exerted axially on the nut by the act of tightening the nut against a resisting member.

An object of the invention is the provision of a generally improved and more satisfactory nut of this kind.

Another object is the provision of a compression locking nut which is re-usable many times; that is, one which can be unscrewed from the bolt on which it has been used, and screwed repeatedly onto the same or different bolts, and which will still retain its tight holding power on the bolt, notwithstanding its repeated removal and re-use.

Still another object is the provision of a nut which, during installation, will not produce the undesired chips or powder produced by certain locking nuts of the prior art.

A further object is the provision of a compression locking nut which is easy and inexpensive to manufacture, simple and quick to use, reliable in action, and not susceptible to become damaged in shipment or handling prior to use or in the act of using it.

A still further object is the provision of a simple and efficient method of manufacturing such a compression locking nut.

These and other desirable objects may be attained in the manner disclosed as an illustrative embodiment of the invention in the following description and in the accompanying drawings forming a part hereof, in which.

Figure 1:
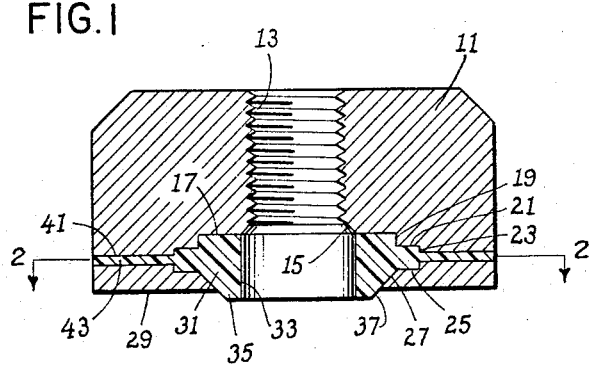
FIG. 1 is an enlarged diametrical section taken axially through a nut in accordance with a preferred embodiment of the invention.

The problem of keeping a nut tight on a bolt or other threaded member is a serious one, particularly under modern conditions of high speed moving parts, causing prolonged severe vibration, often at high frequencies. Many locking nuts of types which were satisfactory in an earlier age of slower moving machinery are not satisfactory for use in the modern high speed age. Even the prior art nuts which most nearly satisfy the modern severe requirements are lacking in fully satisfying such requirements in one or more important respects.

For example, one of the most widely used present-day nuts has, in addition to the internally threaded metal body, an annular insert of fibrous material, the internal diameter of the insert being slightly less than the external diameter of the bolt threads, so that the bolt threads must cut into and form threads in the insert, while the nut is being applied to the bolt. (The word bolt as used in this application is intended in a broad generic sense as meaning any threaded member having a male thread to which the nut is applied, regardless of whether the male threaded member is technically a bolt, a stud, a lag screw, the threaded end of a rod, a threaded tube, or other threaded member.) This construction, although widely used because it is probably the best of the commercially available prior art nuts, has several defects. First, it is difficult and time-consuming to start it on the bolt, because it must be started with sufficient force to cause the threads of the bolt to cut threads in the unthreaded insert. In some instances, starting the nut onto the bolt has been so difficult that mechanics have been known to use a tap to cut internal threads in the insert before applying the nut to the bolt. Of course this destroys the effectiveness of the locking action. Second, the action of the bolt in cutting threads in the insert produces powder or chips, which may be highly undesirable in the presence of a delicate instrument on which the nut is used. Third, the unthreaded inserts are sometimes loosened from and actually knocked out of the body of the nut, by the axial pressure needed to start the insert on the bolt with sufficient force to cut threads in the insert.

Fourth, when using nuts of this type on plated bolts (e.g., plated with zinc) the plating or coating is sometimes stripped off of the bolt by the heat and friction caused by threading the insert forcibly onto the bolt. Fifth, when such nuts are applied to bolts of small delicate sizes, the force necessary to screw the nut onto the bolt sometimes shears the bolt.

Sixth, the above described prior construction is not re-usable a second time. This is a particularly important defect under modern conditions, because it is frequently desired to assemble an intricate and costly mechanism and run it through a series of tests, then disassemble it for transportation or for inspection to see how certain parts stood up under the tests, then reassemble it with precisely the same parts, already tested and proven, for the ultimate operation or use. It is desirable to use exactly the same parts during the final reassembly, even down to the nuts and bolts. But this is not good practice when using the above mentioned prior nuts with fibrous inserts, because it is found that the holding power of the insert on the bolt threads is largely exhausted upon removal of the nut from the bolt on which it was originally placed, and that upon a second application of the nut to the same or a different bolt, the holding power is reduced.

Certain other types of prior art nuts overcome some of the defects of the above mentioned fibrous insert type of nut, but they in turn have still other defects from a practical standpoint. For example, in some of the prior nuts there is an insert of resilient or deformable material, but it is of excessive and uneconomical amount, or placed in an inefficient position, or insecurely held in place, or the construction as a whole is difficult and expensive to manufacture.

Figure 2:
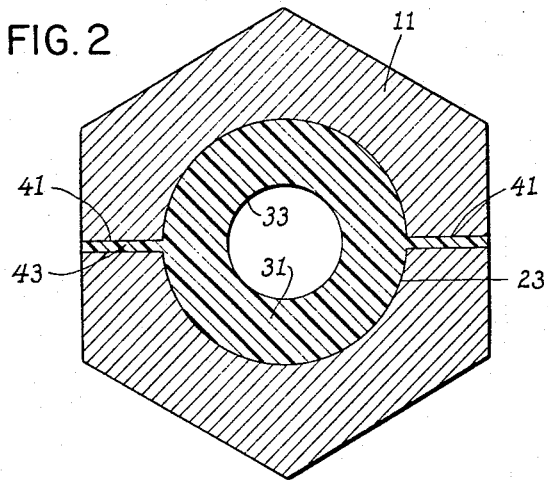
FIG. 2 is a transverse section taken approximately on the line 2—2 of FIG. 1.
Figure 3:
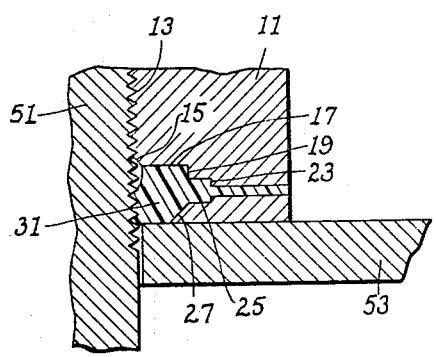
FIG. 3 is a view similar to a fragment of FIG. 1, illustrating the action of the plastic insert in gripping the threads of the bolt under compressive force.

All these defects are overcome by the nut of the present invention, which will now be described with reference first to FIGS. 1 and 2, showing the nut separately in the form it takes when not applied to a bolt, and with reference later to FIG. 3, showing a fragment of the nut as applied to a bolt with sufficient compressive force to deform the plastic insert in the intended manner.

The nut comprises a main body 11 of metal (e.g. ordinary steel, stainless steel, brass, etc.) having an external shape of any conventional kind. A hexagonal nut is shown as an example. The central bore is screw threaded at 13 throughout the major part of the axial length of the bore (thickness of the nut), the threads extending preferably through about two-thirds or three-quarters of the thickness of the nut from the free top face of the nut toward the bottom face which is to make contact with the member to be held by the bolt.

At the bottom end of the screw threads 13, the diameter of the bore is chamfered or flared outwardly and downwardly (conically) for a short distance as at 15. At the bottom end of this chamfered portion, the wall of the cavity or cut-out portion of the metal extends radially outwardly (perpendicular to the axis) for a considerable distance as at 17. At the end of the portion 17, there is a short cylindrical shoulder 19, after which the diameter of the bore is again increased radially as shown at 21. Then comes a second cylindrical shoulder 23, which defines the maximum internal diameter of the cavity or cut-away portion within the body 11 of the nut.

At the lower end of the shoulder 23, the wall of the cavity extends radially inwardly at 25, to a point approximately opposite (i.e., approximately at the same diameter as) the cylindrical shoulder 19. From the inner edge of the portion 25, the wall slopes conically obliquely downwardly and inwardly as at 27, all the way to the bottom face 29 of the main body of the nut. It will be understood that this cavity or cut-away portion within the nut is symmetrical about the axis of the thread of the nut; that is, the cylindrical shoulders 19 and 23 are concentric with each other and with the axis of the screw threads.

Within the cavity is a body 31 of firm but somewhat deformable plastic material having a high degree of elasticity, using this word in its technical engineering sense; that is, a high degree of ability to return to its original shape after a deformng force or pressure is removed. In modern parlance, plastic materials of this kind are sometimes called elastomers. The preferred plastic elastomeric materials for purposes of the present invention are the injection moldable nylons (e.g. Zytel 101), but it is within the scope of the invention to use other comparable plastic elastomeric materials having a similar degree of "memory" for and ability to return to an original shape after being deformed therefrom.

This plastic body 31 has a smooth central bore or cylindrical opening 33 having an internal diameter equal to or very slightly greater than the external diameter of the screw threads of the bolt with which the nut is to be used. Thus, the lower end of the nut can slip over the bolt without causing deformation of the plastic body 31 and without requiring the threads of the bolt to cut any threads therein, so that the application of the nut to a bolt is quick, easy, and does not cause formation of any powder or chips.

The plastic body 31 not only fills all of the above-described cavity or cut-out portion of the nut, below the radial wall 17 (except for the central opening 33, of course) but also projects downwardly slightly below the bottom face 29 of the nut, as indicated at 35. The bottom face of the projecting portion 35 is flat, lying in a transverse plane perpendicular to the axis of the screw thread and parallel to the bottom face 29 of the nut body. The outer face 37 of the projecting portion is oblique or frusto-conical, forming preferably a continuation or prolongation of the frusto-conical wall surface 27 of the nut body.

Figure 4:
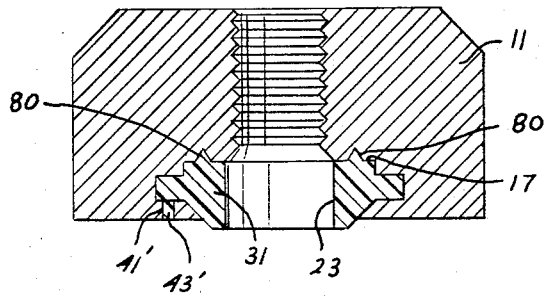
FIG. 4 is an enlarged diametrical section taken axially through a nut in accordance with another embodiment of the invention.
Figure 6:
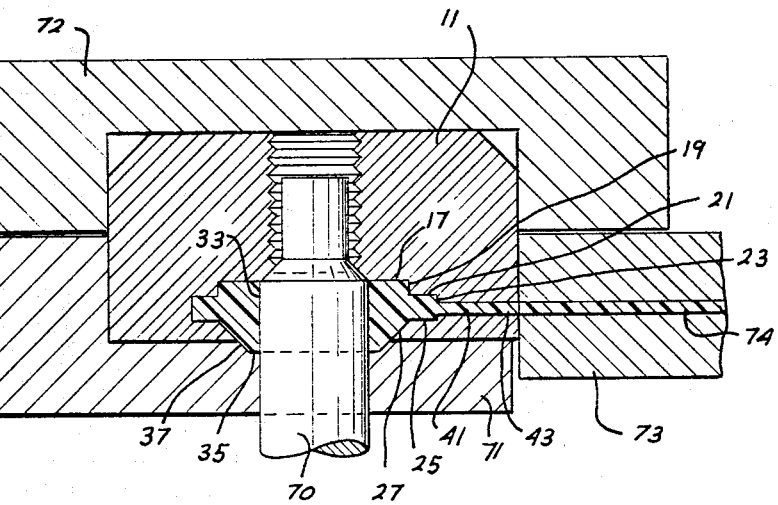
FIG. 6 is a sectional view of a mold assembly used for the injection molding of nuts of the type generally contemplated by this invention.

Preferably, the nut is manufactured by molding the plastic body 31 in place therein, by an injecting molding process. In the preferred method illustrated in FIG. 6 the body of the nut is formed with one or more radial injection openings or bores 41, each injection opening extending from an outer face of the nut inwardly to the cylindrical shoulder 23 (as shown in FIG. 4 the injection opening 41' can extend from the cavity to the bearing face) where it terminates. Each injection opening preferably has a diameter slightly less than the axial thickness between the wall surfaces 21 and 25. The cavity surfaces 17, 19, 21, 23, 25 and 27 of the nut form its own mold, of course, except for the central opening 33 and the projecting end 35, 37, separate mold members 70, 71 being provided for these portions. The portion of mold member 70 positioned within the nut cavity to form wall 33 has a diameter equal to or slightly greater than the external diameter of the screw threads of the bolt with which the nut is to be used. In an injection molding machine, the nut body is held tightly against the mold section 71 by mold section 72 pressing against the top of the nut. The injection nozzle 74 in section 73 of the injection molding machine is brought into tight registry with the injection opening 41 and the plastic nylon or other suitable plastic material is injected under pressure through the injection openings 41. Upon removal from the mold, the sprues 43 remaining within the injection openings 41 are broken off or cut off flush with the outer faces of the nut.

In use, the nut is applied to a bolt partially shown at 51 in FIG. 3, and is screwed down in the usual manner until it engaged tightly against a surface of a work piece or resisting member 53 which it is desired to fasten or hold by means of the bolt and nut. The pressure of the resisting member 53 against the projecting end 35 of the plastic body 31 serves to compress and deform the plastic body, causing it to compress radially inwardly into tight locking engagement with the threads of the bolt, throughout most of the axial length of the body 31. Tightening of the nut is continued until the bottom face 29 of the nut is firmly seated against the top face of the resisting member 53, thus providing a firm metal-to-metal contact at this point, to hold the member 53 immovably and rigidly, as distinguished from the mere resilient holding provided by certain prior types of locking nuts. The amount (volume) and shape of the material in the projecting end 35 of the plastic body, the opening 33 in the plastic and the bolt diameter are so chosen that with the usual normal degree of torque force applied to the nut, the deformation will press the projecting end 35 up into the nut body until it is flush with the bottom face 29 of the nut, thereby permitting the above mentioned direct solid contact of the nut body with the member 53 which is to be held thereby. This upward pushing of the originally projecting end 35 will compress the entire plastic body 31 sufficiently to deform it radially inwardly into tight gripping or locking contact with the screw threads of the bolt, as already mentioned. The above mentioned firm flat contact between the top face of the member 53 and the bottom face 29 of the nut body is not for the purpose of holding the nut against rotation, for that function is performed by the radial gripping or clamping action of the plastic elastomer 31 as above explained, but rather is for the purpose of holding the member 53 firmly and rigidly in the intended position, without any intervening soft resilient material which might give or compress under stress.

One noteworthy feature of this construction is that when the nut is loosened on the bolt, the plastic material 31 will resume its original shape. When the endwise or axial pressure is removed, the portion 35 will project once more from the lower face of the nut, just as it did originally, and the internal diameter 33 of the plastic body will expand once more to its original cylindrical shape and size, free of the threads of the bolt. The nut can be used repeatedly, many times, and yet the plastic gripping body will spring back each time the nut is loosened, to its original shape, ready for use again.

Another noteworthy feature, closely related to the one just mentioned, is that the degree of gripping power remains substantially constant or uniform and predictable (for a given uniform torque force used in tightening the nut) throughout repeated re-use of the nut. This is particularly important in meeting certain exacting Government specifications, which require that nuts in certain critical locations be tightened to a certain calibrated torque, and which demand that when the nut is thus tightened, it shall hold tight against an unscrewing force of a certain specified torque and shall come loose in response to an unscrewing force of a slightly higher specified torque. The nut of the present invention meets these rigorous specifications not only upon the first use of a new nut, but also on subsequent uses over and over again for many times, so that this nut is particularly suitable for those uses briefly mentioned above, wherein a mechanism is completely assembled, tested, disassembled for inspection (or for transportation), and then is to be assembled again with all the original parts, including the original nuts.

Even after long usage or storage in hot dry atmospheres, the present nut retains its effectiveness. The plastic material 31, having been forced into the nut cavity under high pressure during the injection molding step, fits very tightly therein, and is not likely to shrink enough to become appreciably loose. The many angles and corners of contact between the plastic material and the metal body of the nut serve to increase the frictional grip between the plastic and the metal, the impede relative rotation between the two, and the sprues 43 in FIG. 1 or 43' in FIG. 4 positively lock or anchor the plastic against rotation in the nut body, in any event, even if it shrinks to a slightly loose condition. Of course, when the nut is tightened in use, the axial or endwise pressure on the portion 35 will tighten the entire plastic body 31 in its cavity, even if it was slightly loose before the nut was tightened.

Figure 5:
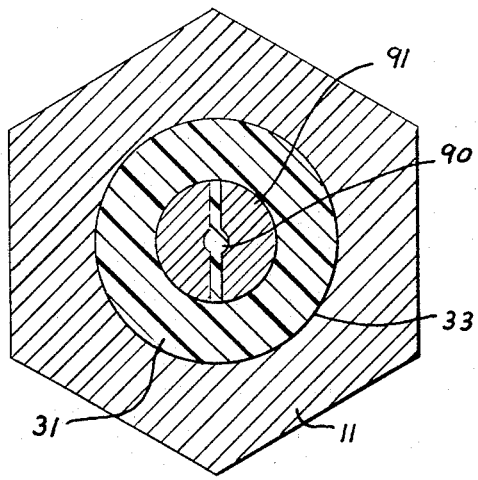
FIG. 5 is a transverse section similar to that in FIG. 2 but of still another embodiment of the invention.

As is shown in FIG. 4, the positive locking or anchoring of the insert can be accomplished by staking 80 the nut cavity at intervals on the wall portion 17. This type of locking is especially useful where the plastic body 31 is formed by injection molding through an internally positioned injection nozzle; for example as is shown in FIG. 5 where the injection nozzle 90 is a channel in the mold portion 91 which serves to form wall portion 33 of the elastomeric insert 31.

It will be noted from the drawings that the area of the projecting end 35 of the plastic material is very small compared to the area of the bottom face 29 of the nut body. The face 29 presents a large area for flat metallic contact with the part 53 to be held by the nut, and the plastic locking body does not interfere with or detract from the desired large area contact of the lower face of the nut with the part which is to be held or fastened thereby.

It has been mentioned that the outer edge 37 of the projecting end 35 of the plastic material is of frusto-conical shape. This is important in insuring that the axial pressure caused by tightening the nut will force the projecting plastic material up into the nut body. If the outer edge of the plastic material were cylindrical rather than conical, the axial pressure would tend to mash the plastic material radially outwardly to form a thin fin or flange which would prevent the bottom face 29 of the nut from seating tightly against the part 53 to be held thereby.

The exact angle of slope of the face 37 is subject to some variation. In general, the total included angle of the frusto conical face may be from about 70 degrees to about 120 degrees, so that the half angle (or angle to the longitudinal axis of the bolt) is about 35 degrees to 60 degrees. In general, the smaller angles are used on the larger sized nuts, and large angles on smaller sized nuts.

To give a few dimensions by way of example but not by way of limitation, a nut for a bolt having a diameter of ½ inch and with 13 threads to the inch (what is called a ½–13 bolt) may have the plastic body 35 project an axial distance of 0.150 of an inch beyond the lower face of the nut, and the sloping frusto conical face 37 may have a total included angle of 70 degrees. In a nut for a ¼–20 bolt, the extent of axial projection of the plastic material may be 0.035 of an inch and the included angle may be 100 degrees. In a nut for a machine screw of so-called size 6–32, the axial projection may be 0.0115 of an inch and the total included angle of the frusto conical surface may be 120 degrees. In each case, the internal diameter 33 of the plastic body may be the same as the nominal external diameter of the bolt. This provides a slight clearance between the plastic material and the bolt threads when threading the nut into the bolt, because the actual external diameter of the threads on the bolt is always slightly less than the nominal diameter of the bolt.

The foregoing portion of the specification is a continuation-in-part of my co-pending application Serial No. 99,830, filed March 31, 1961, and the portion of the specification which follows is a continuation-in-part of my co-pending application Serial No. 232,837, filed October 24, 1962.

Another embodiment of the invention relates to a free spinning or compression type locking nut of the type previously described but which is also retained on a bolt by a cotter pin and/or a retaining wire.

It is an object of this aspect of the invention to provide the free spinning locking nut as aforesaid either in the form of a castellated nut and/or in the form of a locking nut having a bore extending through one side portion thereof for receiving a retaining wire adapted to be attached to an adjacent element to hold the nut against removal from a bolt on which it is threaded; the compression locking the nut on the bolt will prevent rotation of the nut on the bolt and cooperate with the cotter pin and/or retaining wire to prevent shearing of the cotter pin and bending and breakage of the retaining wire.

The problem of keeping a nut tight on a bolt has always presented a problem because on moving machinery subject to constant vibration, nuts frequently loosen on the bolt and unless provided with some sort of retaining means will vibrate off the bolt and cause serious problems with the operation of the machinery. Retaining wires have been used which engage through bores in the nuts and are secured to adjacent objects or parts of the machine. These have not prevented the nuts from coming loose on the bolt and due to the vibration in the machinery using retaining wires on the nuts, they have been found to frequently vibrate to such an extent that the wires are twisted and broken subsequently becoming detached from the nut and thereby falling off the bolt and causing substantial problems. Cotter pins have been used with castellated nuts for retaining the nuts engaged on the bolt. These castellated nuts also become loosened on the bolts due to the slight movement that the nuts may have relative to the bolts on which they are mounted and it has been found that in many instances the working of the nuts back and forth on the bolt will shear the cotter pin so the nut will subsequently become lost. This problem of retaining nuts on bolts is becoming an increasingly more serious problem due to the high speed machinery now in use as compared with the slower moving machinery of an earlier age.

The present aspects of the invention provides an improvement over the free spinning or compression type locknut heretofore described, in that by using either or both of the castellated nut and cotter pin or the retaining wire features in combination so that the nylon body will prevent rotation of the nut on the bolt and thereby cooperate with the cotter pin and retaining wire or either of them to provide a combined cooperative locking action of the nut on the bolt to prevent loss of the nut.

Figure 7:
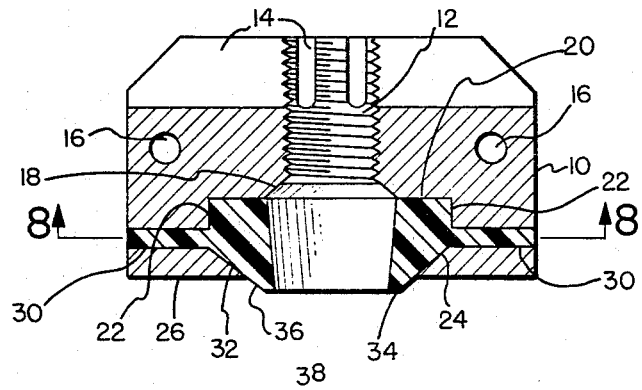
FIG. 7 is a vertical transverse cross section through a nut constructed according to another embodiment of the invention.
Figure 8:
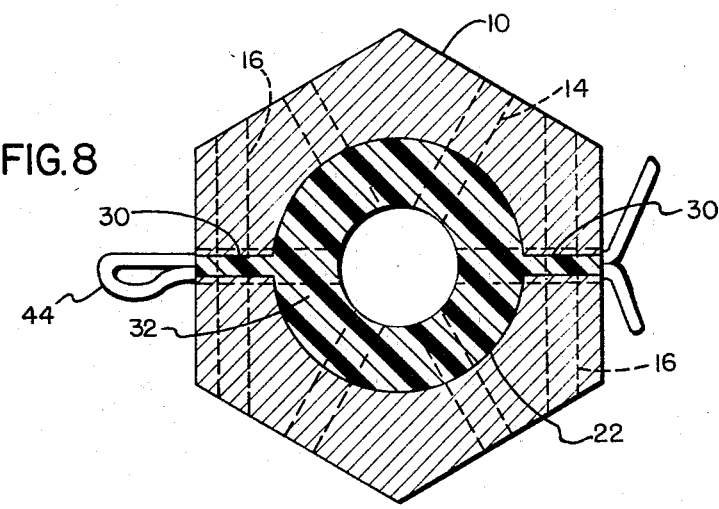
FIG. 8 is a cross section taken along line 8—8 of FIG. 7.
Figure 9:
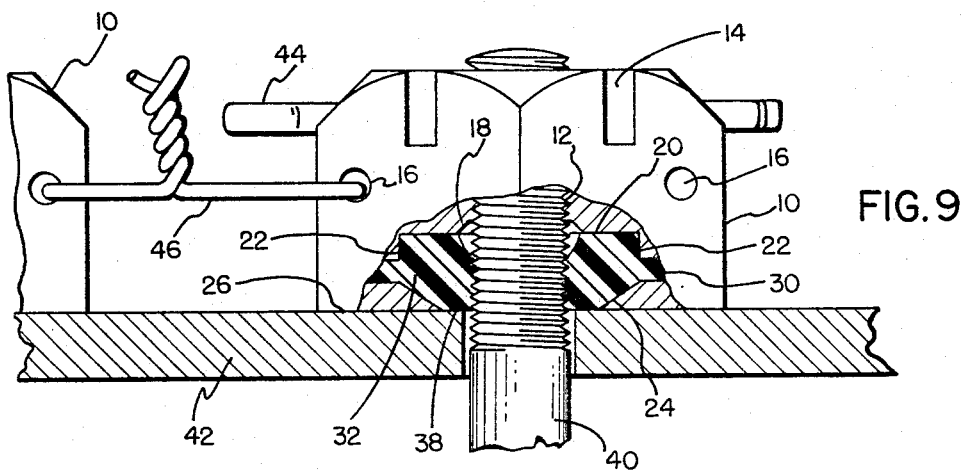
FIG. 9 is a side elevation of a nut embodying the invention as disclosed in FIGS. 7 and 8 applied to a bolt in position to secure a member in assembled relation with portions broken away and shown in cross section to illustrate the operation of this embodiment of the invention.

According to this aspect of the present invention, as can be seen in FIGS. 7–9, the nut has a main body 10, formed of suitable metal such as ordinary steel, stainless steel, brass, etc. and provided with an external shape of any conventional character such as square, hexagonal, etc. A hexagonal nut is shown as an example. The central bore is screw threaded throughout one end portion at 12 for about two-thirds to three-fourths of the thickness of the nut body and is, with respect to the compression locking feature of the same construction and functions in the same manner as that heretofore described, as for example, in connection with the embodiments illustrated in FIGS. 1 to 5 and can be produced by the method heretofore described. The free top face of the nut as shown in the drawings FIG. 7 for example, is castellated by providing a plurality of diametrically extending slots 14. The nut body may also be formed with one or more transversely extending bores 16 offset from the central threaded bore 12 and having opposite ends open through spaced portions of the sides of the nut body.

In use, this embodiment of the nut is applied to a bolt partially shown at 40 in FIG. 9, and is screwed down in the usual manner until it enagages tightly against the surface of a member 42 which it is desired to fasten or hold by means of the bolt and nut. The pressure of the member 42 against the projecting portion or bottom wall 38 of the plastic insert 32 serves to compress and deform the plastic body. As the plastic body is deformed it is compressed inwardly toward the cavity in the nut body so that it will fill the space between the outer surface of the threads and between the threads about the bolt into tight locking engagement with the threads of the bolt throughout most of the axial length of the plastic insert 32. When the nut is tightened until the bottom wall 26 is firmly seated against the face of the member 42 to provide a firm metal to metal contact between the nut and the member, the plastic insert 32 will be compressed into tight gripping engagement with the threads of the bolt within the cavity in the main body 10 of the nut to tightly lock the nut on the bolt. The reverse taper or conical wall portion 24 and the conical wall portion 36 of the plastic insert will cooperate in causing the plastic during deformation to extend toward the threads on the bolt during the deformation of the plastic body to move inwardly and fill the cavity and grip the threads on the nut on the bolt to firmly lock the nut on the bolt.

When the main body 10 of the nut has a bottom wall 26 firmly engaged with the member 42, the nut performs its function of attaching the member 42 in cooperation with the bolt to perform its holding function. The plastic insert 32 has the projecting portion compressed into the cavity in the main body 10 to firmly engage the surfaces of the threads within the cavity of the main body 10 and effectively lock the nut on the bolt against rotation.

By using nylon as the plastic insert 32, the nut can be removed and repeatedly applied to the bolt, since the nylon regains its shape upon removal from the bolt. The central bore through the nylon insert 32 has its surface slightly spaced beyond the outer edges of the threads on the bolt so that the nut can be readily applied and removed from the bolt without injury to the insert.

Another noteworthy feature closely related to the one above mentioned, is that the degree of gripping power remains substantially constant or uniform and predictable throughout repeated reuse of the nut for a given uniform torque force used in tightening the nut. This is particularly important in meeting certain exacting government specifications, which require that nuts in certain critical locations be tightened to a certain calibrated torque. These specifications demand that when a nut is thus tightened, it shall hold tight against an unscrewing force of a certain specified torque and shall come loose in response to an unscrewing force of a slightly higher specified torque. The nut of the present invention meets these regular specifications not only upon the first use of a new nut, but also on subsequent uses over and over again for many times, so that this nut is particularly suitable for many uses where it is necessary to apply and remove a nut in connection with machinery that requires assembly, testing, disassembly for inspection, repair, etc.

Some applications require that the nut be provided with means for retaining the nut on the bolt. For this purpose, castellated nuts are employed and the bolts are provided with a transverse slot or bore for receiving a cotter pin 44. When the nut is tightened against the member 42 to the desired degree as described above, one of the diametrical slots in the outer or top end of the nut as shown in FIG. 7, for example, will be located opposite the transverse bore in the bolt for receiving a cotter pin through the bore in the bolt with opposite ends lying within the recess in the upper or outer end of the nut body 10.

When the plastic insert is locked on a bolt as above described against a member 42 for holding it in assembled relation, it cooperates with the cotter pin to prevent movement of the nut relative to the bolt. With the tight clamping of the bolt by the plastic insert 32, it facilitates holding the nut in position on the bolt against relative movement thereto and cooperates with the cotter pin 44 in preventing movement of the nut on the bolt. At the same time, the plastic insert in gripping the bolt cooperates to prevent movement of the nut on the bolt by which the nut would have a tendency to engage the cotter pin 44 and shear it off where the threaded portion of the nut engages the threads on the bolt adjacent to the cotter pin.

This provides a substantial improvement over using a cotter pin alone or other means in conjunction with the cotter pin for holding the nut on the bolt because the resistance of the present plastic body prevents the nut from vibrating relative to the bolt under various types of vibration to which the bolt and nut are subjected and effectively reduces any tendency of the nut to turn on the bolt with sufficient force to shear the cotter pin.

As shown in FIG. 9, the plastic insert 32 may also cooperate with a retaining wire 46 engaged through the bore 16 in the nut when it is attached to an adjacent part of the mechanism which the nut secures together in assembled relation to prevent bending and breakage of the retaining wire. This cooperation is achieved in the same manner explained above in conjunction with the cotter pin. Where a specification for the use of nuts requires the use of both cotter pins and retaining wires, the plastic insert 32 in firmly retaining the nut against rotation on the bolt cooperates with the cotter pin as well as the retaining wire to prevent shearing or breakage of both the cotter pin and retaining wire for effectively retaining the nut on the bolt against detachment therefrom and against relative movement thereto.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

A method and automatic machine for producing free spinning locknuts of the type disclosed herein is disclosed in co-pending application of David Ohl and Charles C. Davis, Jr., Serial No. 272,625, filed April 12, 1963.

I claim:

1. A compression locking nut comprising a metallic nut body having a central bore threaded throughout a substantial part of the length of the nut body from the top face thereof and having an unthreaded cavity of substantially larger diameter than said threaded bore extending a substantial distance through another part of the length of the nut body and opening through the bottom face of the nut body, and a body of a plastic elastomer material which has memory positioned within said unthreaded cavity, the nut being characterized in that
  (a) said unthreaded cavity is undercut so as to be of substantially larger diameter at a point spaced axially inwardly from said bottom face than its diameter at said bottom face; the opening in said bottom face and the undercut portion of said cavity being connected by a section of frusto conical shape that has a total included angle in the range of 70° to 120° extending from the outer face toward the undercut portion;
  (b) said nut body has at least one lateral passageway extending from said unthreaded cavity approximately radially outwardly to an outer lateral face of said nut body;
  (c) said body of plastic elastomer material has a central axial opening which, throughout its entire axial length, is slightly larger in diameter than the maximum diameter of the threads of a bolt on which the nut is to be used;
  (d) said body of plastic elastomer material has an external periphery fitting tightly in the undercut portion of said unthreaded cavity and has an integral portion extending laterally into and filling said lateral passageway in said nut body, the tight fit of said plastic body in said cavity and the presence of said integral portion of said plastic body extending into said passageway together serving to anchor said plastic body permanently in said nut body and to prevent separation thereof under conditions of repeated use, removal and re-use of the nut;
  (e) said body of plastic elastomer material projects axially beyond said bottom face of said nut body;
  (f) the portion of said plastic elastomer material which projects beyond the bottom face of said nut has an outer lateral face of frusto-conical shape of decreasing diameter in an axial direction away from said bottom face of the nut body, the total included angle of said frusto-conical face being the same as the total included angle of the frusto-conical section connecting the undercut cavity and the outer nut face;
  (g) and wherein the volume of the projecting plastic material is substantially equal to the volume of the space between the central axial opening through the plastic body and the inwardly adjacent outer surface of a bolt on which the nut is threaded, and characterized in that when the projecting plastic portion engages a resisting member, it will be deformed axially to a nonprojecting position flush with the bottom of the nut and will be deformed radially inwardly into such space and tightly grip the threads of the bolt and without being deformed radially outwardly between the bottom face of the nut body and the resisting member.

2. A nut according to claim 1 wherein the plastic elastomer body has been formed in situ in the undercut cavity by injection molding to insure a tight fit between the plastic and the cavity walls.

3. A construction as defined in claim 1, further characterized by the fact that said plastic elastomer material is nylon.

4. A nut according to claim 1 wherein said nut body has at least one opening extending through said metallic body in a lateral direction relative to the axis of said central bore and in non-intersecting relation to any part of said body of plastic elastomer material for receiving a supplemental fastening member such as a retaining wire.

5. A nut according to claim 1, wherein the free top face of said nut body has a plurality of diametrically extending slots for receiving a cotter pin engaged through an aperture in the bolt; said plastic body cooperating with the cotter pin in locking said nut on said bolt so the plastic body prevents the nut from shearing off the cotter pin.

6. A compression locking nut comprising a metallic nut body having a central bore threaded throughout a substantial part of the length of the nut body from the top face thereof and having an unthreaded cavity of substantially larger diameter than said threaded bore extending a substantial distance through another part of the length of the nut body and opening through the bottom face of the nut body, and a body of a plastic elastomer material which has memory positioned within said unthreaded cavity, the nut being characterized in that
  (a) said unthreaded cavity is undercut so as to be of substantially larger diameter at a point spaced axially inwardly from said bottom face than its diameter at said botthom face; the opening in said bottom face and the undercut portion of said cavity being connected by a section of frusto conical shape that has a total included angle in the range of 70° to 120° extending from the outer face toward the undercut portion;
  (b) said body of plastic elastomer material has a central axial opening which, throughout its entire axial length is slightly larger in diameter than the maximum diameter of the threads of a bolt on which the nut is to be used;
  (c) said body of plastic elastomer material has an external periphery fitting tightly in the undercut portion of said unthreaded cavity and locked therewith to prevent the plastic body from rotating within the nut body and to prevent it from becoming axially separated from the nut body;
  (d) said body of plastic elastomer material projects axially beyond said bottom face of said nut body;
  (e) the portion of said plastic elastomer material which projects beyond the bottom face of said nut has an outer lateral face of frusto-conical shape of decreasing diameter in an axial direction away from said bottom face of the nut body, the total included angle of said frusto-conical face being the same as the total included angle of the frusto-conical section connecting the undercut cavity and the outer nut face;
  (f) and wherein the volume of the projecting plastic material is substantially equal to the volume of the space between the central axial opening through the plastic body and the inwardly adjacent outer surface of a bolt on which the nut is threaded, and characterized in that when the projecting plastic portion engages a resisting member, it will be deformed axially to a non-projecting position flush with the bottom of the nut and will be deformed radially inwardly into such space and tightly grip the threads of the bolt and without being deformed radially outwardly between the bottom face of the nut body and the resisting member.

7. A nut according to claim 6 wherein the plastic elastomer body has been formed in situ in the undercut cavity by injection molding to insure a tight fit between the plastic and the cavity walls.

8. A construction as defined in claim 6, further characterized by the fact that said plastic elastomer material is nylon.

9. A nut according to claim 6 wherein said nut body has at least one opening extending through said metallic body in a lateral direction relative to the axis of said central bore and in non-intersecting relation to said body of plastic elastomer material for receiving a supplemental fastening member such as a retaining wire.

10. A nut according to claim 6 wherein the free top face of said nut body has a plurality of diametrically extending slots for receiving a cotter pin engaged through an aperture in the bolt; said plastic body cooperating with the cotter pin in locking the said nut on said bolt so the plastic body prevents the nut from shearing off the cotter pin.

References Cited by the Examiner

UNITED STATES PATENTS

| | | | |
|---|---|---|---|
| 1,394,012 | 10/1921 | Hill | 151—5 |
| 2,389,377 | 11/1945 | Manning | 151—7 |
| 2,421,105 | 5/1947 | Warren | 151—7 |
| 3,018,519 | 1/1962 | Morin et al. | 151—7 |
| 3,040,796 | 6/1962 | Gouverneur | 151—7 |
| 3,129,742 | 4/1964 | Faroni et al. | 151—5 |

FOREIGN PATENTS

| | | |
|---|---|---|
| 123,346 | 1/1947 | Australia. |
| 346,843 | 12/1904 | France. |

EDWARD C. ALLEN, *Primary Examiner.*